United States Patent [19]

Moore et al.

[11] Patent Number: 4,779,815
[45] Date of Patent: Oct. 25, 1988

[54] SUPPORT FOR COILED ARTICLES

[75] Inventors: Edward K. Moore, 422 Los Encinos Ave., San Jose, Calif. 95134; Lam L. Tai, Hong Kong, Hong Kong

[73] Assignee: Edward K. Moore, San Jose, Calif.

[21] Appl. No.: 82,293

[22] Filed: Aug. 6, 1987

Related U.S. Application Data

[63] Continuation-in-part of Ser. No. 889,660, Jul. 28, 1986, Pat. No. 4,688,739.

[51] Int. Cl.⁴ .............................................. B65H 75/38
[52] U.S. Cl. .................................... 242/85.1; 242/106
[58] Field of Search .................... 242/85.1, 96, 125.1, 242/125.2, 125.3, 106; 191/12 R, 12.2 R, 12.4; 24/115 F, 115 H, 115 K, 129 R, 129 B, 71.1, 71.2, 71.3; 248/49, 65, 76, 304, 305, 306

[56] References Cited

U.S. PATENT DOCUMENTS

| | | | |
|---|---|---|---|
| 1,058,925 | 4/1913 | Toegel | 242/85.1 |
| 1,061,642 | 5/1913 | Stoup | 242/106 |
| 2,469,103 | 5/1949 | Carlson | 242/96 |
| 2,470,212 | 5/1949 | Carlson | 242/96 |
| 2,678,778 | 5/1954 | Gibson | 242/96 |
| 2,746,112 | 5/1956 | Simon | 24/129 B |
| 2,778,582 | 1/1957 | Arthur | 242/96 |
| 3,485,468 | 12/1969 | Schweitzer, Jr. | 248/74 |
| 4,062,430 | 12/1977 | Momberg | 191/12 R |
| 4,123,012 | 10/1978 | Hough | 242/85.1 |
| 4,261,529 | 4/1981 | Sandberg et al. | 242/85.1 |

FOREIGN PATENT DOCUMENTS 2528250  9/1983  France ...................... 242/85.1

Primary Examiner—John M. Jillions
Attorney, Agent, or Firm—Thomas Schneck

[57] ABSTRACT

A support apparatus for an electric cord, a garden hose, and the like having first and second cantilevered arm members defining an elongated slot. The elongated slot is dimensioned to receive successive loops of a coiled article, but prevents passage of the terminal members of the coiled article. First and second flexible tang members are cantilevered from the arm members and extend into the elongated slot for blocking engagement with a coiled article retained in the elongated slot. The tang members are self-yieldingly responsive to a forceful movement of the coiled article, so as to permit insertion and removal of successive loops from the elongated slot. The tang members have rounded entrance edges to facilitate insertion and have diverging end segments to facilitate removal of the coiled article. The surfaces which define the elongated slot have notches disposed to permit free movement of the diverging end segments of the tang members.

14 Claims, 1 Drawing Sheet

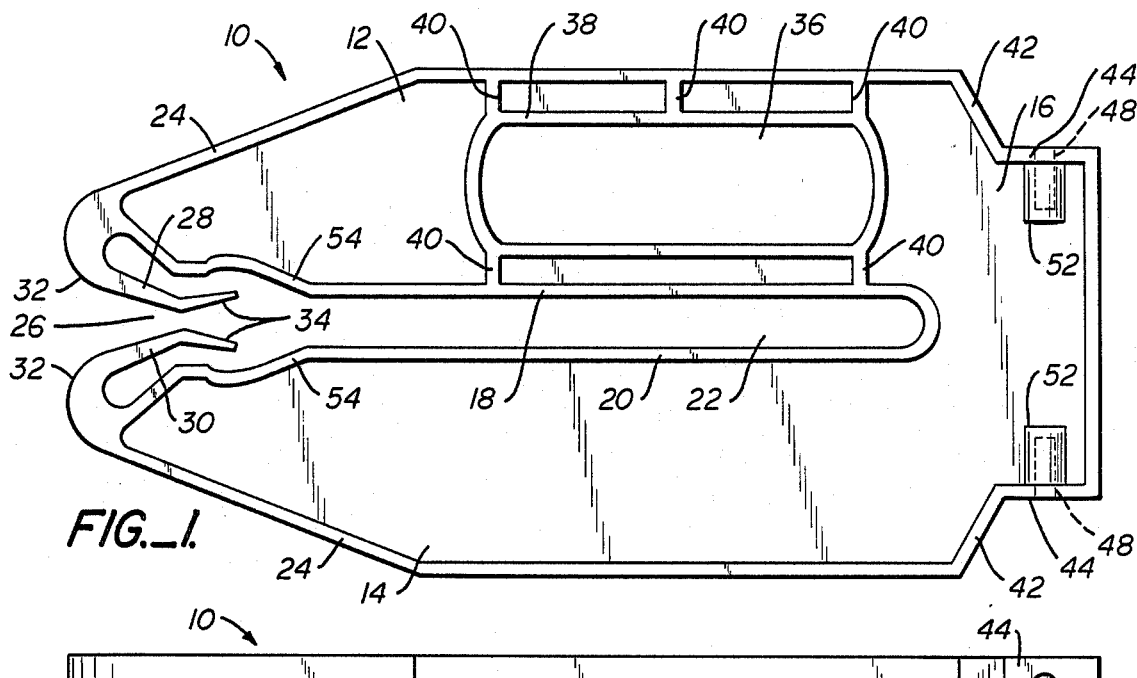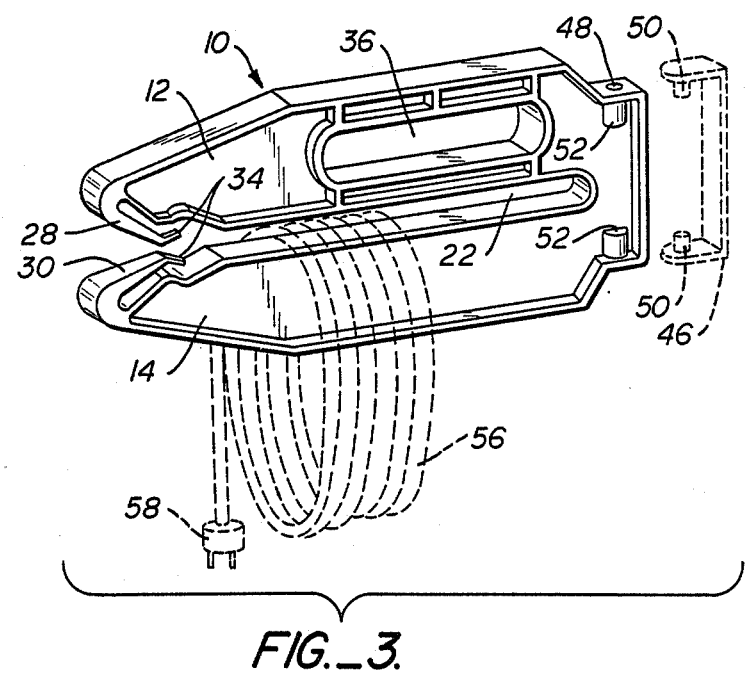
FIG._1.
FIG._2.
FIG._3.
FIG._4.

SUPPORT FOR COILED ARTICLES

CROSS REFERENCE TO RELATED APPLICATION

This is a continuation-in-part of patent application Ser. No. 889,660, filed July 28, 1986, now U.S. Pat. No. 4,688,739.

TECHNICAL FIELD

The present invention relates to apparatus for supporting and feeding coiled articles.

BACKGROUND ART

Devices for storing garden hoses, electric cords, lines and the like in a coiled condition are known. Typically, such devices provide two widely spaced apart surfaces onto which are wrapped the coils of the article to be stored. Such devices are described in U.S. Pat. Nos. 1,058,925 to Toegel, 2,470,212 to Carlson, 4,123,012 to Hough and 4,261,529 to Sandberg et al. While the devices are adequate for storing coiled articles, each device requires the article to be wound onto the spaced apart surfaces and then unwound in the opposite direction to utilize the uncoiled article for the intended purpose. This winding and unwinding process is time consuming and can become very tedious for storage of articles such as garden hoses which are used on almost a daily basis.

French Pat. No. 2,528,250 to Doridant describes a support for electric extension cords which has a flattened S-shape. The extension cord is supported on a horizontal rod. The Doridant device is an improvement over the prior art since it does not require a user to wind and unwind the extension cord about spaced apart surfaces. However, nothing prevents the male plug or female socket of the extension cord from being unintentionally unwound over the top of the horizontal rod by the weight of the first full loop of extension cord. Moreover, the device is limited to a horizontal orientation.

It is an object of the present invention to provide a support apparatus for coiled articles which allows storage in either a horizontal or a vertical orientation and in an efficient manner.

DISCLOSURE OF THE INVENTION

The above object has been met by a support apparatus which slidably receives sequential loops of a coiled article, whereafter the loops are prevented from escape by flexible tang members. The support apparatus has a unitary framework having an elongated article-receiving slot. The elongated slot has a width which is less than twice the diameter of the article to be stored, thereby permitting entrance of the intermediate portion of the coiled article but preventing lateral passage of enlarged terminal members of the article. Thus, unlike the prior art which typically requires winding and unwinding of a coiled article about a pair of surfaces, the present invention is dimensioned to prevent unwinding along a support surface.

The flexible tang members are cantilevered from the article-receiving end of the elongated slot and each tang member projects into the elongated slot for blocking engagement with the end loop of a coiled article. The tang members are sufficiently rigid to withstand the full weight of the coiled article, but are yieldingly responsive to forceful movement of the article. The surfaces defining the elongated slot have notches so as not to inhibit flexing of the tang members.

An advantage of the present invention is that it permits straight line feeding and extraction of a coiled article. A second advantage is that unintended uncoiling is prevented since a terminal member of the article will not pass through the elongated slot. Anoher advantage is that storage may have either a vertical or a horizontal orientation.

BRIEF DESCRIPTION OF THE DRAWINGS

FIG. 1 is a side view of a support apparatus in accord with the present invention.

FIG. 2 is a bottom view of the support apparatus of FIG. 1.

FIGS. 3 and 4 are perspective views of the support apparatus of FIG. 1 showing a coiled electric cord in phantom.

BEST MODE FOR CARRYING OUT THE INVENTION

With reference to FIGS. 1 and 2, the support apparatus 10 is a unitary framework having a generally flat profile. The framework includes an upper arm member 12, a lower arm member 14, and a base 16 from which the arm members 12 and 14 are cantilevered. The upper arm member 12 has a slot surface 18 that is parallel to a slot surface 20 of the lower arm member 14. The slot surfaces 18 and 20 are spaced apart to define an article-receiving elongated slot 22.

The support apparatus 10 has a generally rectangular configuration with forward edges 24 which are inclined toward an opening 26 of the elongated slot 22. Cantilevered from the upper and lower arm members 12 and 14 are tang members 28 and 30. The tang members 28 and 30 project inwardly for blocking engagement with a coiled article supported within the elongated slot 22. The tang members 28 and 30, in conjunction with the inclined forward edges 24 of the arm members, form rounded edges 32 at the article-receiving opening 26. The tang members also have diverging end segments 34. The rounded entrance edges 32 and the diverging end segments 34 facilitate insertion and removal of articles into the elongated slot 22.

Above the elongated slot 22 is a handle aperture 36 formed in the upper arm member 12. The handle aperture is typically 120 mm in length and 35 mm wide, thereby permitting insertion of a gloved hand. A protruding aperture rim 38 and ribs 40 are provided for increased strength for hand carrying the apparatus.

The base 16 includes tapering portions 42 which join the arm members 12 and 14 to bearing surfaces 44 for connection with an attachment bracket 46, shown in phantom in FIGS. 3 and 4. Holes 48 through the bearing surfaces 44 are disposed to receive detents 50 of the attachment bracket 46. The attachment bracket is made of a flexible material to permit repeated removal of the detents 50 for the holes 48. Rounded protrusions 52 strengthen the connection of the supporting apparatus 10 to the attachment bracket 46.

Referring again to FIGS. 1 and 2, elongated slot 22 extends across the length of the arm members 12 and 14. At an end proximate the tang members 28 and 30, the slot surfaces 18 and 20 which define the elongated slot each have a notch 54. The notches 54 provide increased spacing for movement of the diverging end segments 34 of the tang members. The dimensions of the elongated slot 22 should be tailored for the intended use. By way of example, an elongated slot for supporting an electric cord may have a width of 14 mm and a length of 210 mm. The width should be such that the slot is less than twice the diameter of the intermediate portion of the coiled article to be supported, thereby permitting slidable accommodation of the intermediate portion but preventing passage of coiled article terminal elements through the elongated slot. In this manner the coiled article cannot unintentionally unwind and the loops of the coiled article will be retained in an orderly fashion.

Again using support of an electric cord as an example, the narrowest spring of slot opening 26 should be approximately 6 mm. Obviously the optional dimensions of the elongated slot 22 and the slot opening 26 will be different if support of a garden hose is the intended purpose of the support apparatus 10, but in all instances the tang members 28 and 30 should be disposed for blocking engagement with the loops of the coiled article. The tang members are to be made of a flexible material, preferably a plastic material, which is self-yieldingly responsive to forceful movement of the coiled article.

In operation, FIG. 3 shows a supporting apparatus 10 having a horizontal orientation. Successive loops of a coiled member 56, shown here as an electric cord, are slidably accommodated within the elongated slot 22. The electric cord 56 is initially inserted into the elongated slot 22 by positioning the female socket, not shown, adjacent to the slot opening. The electric cord is then forced against the tang members 28 and 30 to overcome the biasing of the tang members. The electric cord is inserted in successive loops until the male plug 58 is reached. The female socket and the male plug 58 are too large to pass through the elongated slot, so that the electric cord is held captive by the biasing of the tang members 28 and 30 and by the electric cord itself. Support of the coiled article relies solely upon the contact of individual coil loops with the upper surface of the arm member 14.

When the coiled article is required to be retrieved from storage, the outboard terminal element, here a male plug 58 of an electric cord, is grasped and pulled. The first loop of the coiled article will fit within the diverging end segments 34 of the tang members, whereafter the bias of the tang members will be overcome by the force applied to the coiled article. Continued application of force on the free end of the coiled article will result in the paying out in one direction of successive loops, until the entirety has been extracted from the elongated slot 22. Alternatively, the support apparatus 10 may be removed from the attachment bracket 46 and carried to a location for insertion of the inboard terminal element, not shown, of the electric cord, whereafter only a portion of the electric cord need be extracted.

FIG. 4 illustrates a support apparatus 10' having a vertical orientation. Again, successive loops of a coiled article 60 are inserted into the elongated slot 22 to secure the coiled article in position. The operation is identical to that of FIG. 3, but on a vertically mounted support apparatus 10' the tang members 28 and 30 must be sufficiently rigid to support the weight of the coiled article 60 and, yet, sufficiently flexible to yield upon the application of force on the coiled article by a user.

While the present invention has been illustrated as an apparatus for supporting an electric cord, it is to be understood that the invention may be employed to support garden hoses or other coiled articles.

We claim:

1. A support apparatus for a coiled article comprising,
   first and second arm member having adjacent, mutually facing, slot surfaces spaced apart to define at least a portion of an elongated article-retaining slot therebetween, said arm members each having a base end and an open article-receiving end,
   a first tang member cantilevered from said article-receiving end of the first arm member in a direction projecting into said elongated slot and yieldingly biased for blocking engagement with a coiled article retained in said elongated slot, said first tang member being self-yieldingly responsive to a forceful movement of said coiled article, said first tang member having opposed first and second sides, and connected to said first arm member in hook-like fashion to form a first flexing zone between said first side and said first arm member, and
   a second tang member cantilevered from said article-receiving end of the second arm member in a direction projecting into said elongated slot for self-yielding engagement with a coiled article retained in said elongated slot, said second tang member having opposed first and second sides, and connected to said second arm member in hook-like fashion to form a second flexing zone between said first side and said second arm member, said second side spaced apart from said second side of the first tang member to define an article-receiving opening therebetween.

2. The support apparatus of claim 1 having a base connecting said base ends of the first and second arm members.

3. The support apparatus of claim 2 further having a bracket, said bracket having detents and said base having holes disposed to receive said detents.

4. The support apparatus of claim 1 wherein said slot surfaces of the first and second arm members have opposed notches disposed to receive said tang members.

5. The support apparatus of claim 1 wherein said second arm member is a handle member having an aperture disposed to receive a hand.

6. The support apparatus of claim 1 wherein said cantilevered first and second tang members have end segments extending in diverging relation to each other.

7. A support apparatus for accommodation of a coiled article comprising,
   a base member,
   first and second flexible arm members cantilevered from said base means, said first and second arm members spaced apart by an elongated slot defined by parallel surfaces of said first and second arm members, said elongated slot having an open end opposite said base member, and
   first and second flexible tang members, said first tang member cantilevered from said first arm member and said second tang member cantilevered from said second arm member at least closely adjacent said open end of the elongated slot, said first and second tang members extending into said elongated slot in hook-like fashion for blocking engagement with a coiled article retained in said elongated slot, said elongated slot segmented into an article-receiving opening and first and second flexing zones at an end distal from said base member, said first and second flexing zones each defined by spaced walls of a tang member and an associated arm member, said article-receiving opening defined by adjacent edges of said first and second tang members, said tang members having a normal blocking position and a flexed retraced position.

8. The support apparatus of claim 7 wherein said elongated slot has dimensions such that the width of the elongated slot is less than twice the diameter of an intermediate portion of a coiled article to be stored.

9. The support apparatus of claim 7 wherein said parallel surfaces defining said elongated slot each have a notch disposed to permit said tang members to flex into said retraced position.

10. The support apparatus of claim 7 wherein said first and second tang members have diverging end segments opposite said open end of the elongated slot.

11. A support apparatus for a coiled article comprising, first and second arm members having adjacent, mutually facing, slot surfaces spaced apart to form an elongated slot therebetween, said arm members each having a base end and an open article-receiving end, a first tang member cantilevered from said article-receiving end of the first arm member in a direction projecting into said elongated slot and yieldingly biased for blocking engagement with a coiled article retained in said elongated slot, said first tang member being self-yieldingly responsive to a forceful movement of said coiled article, and a second tang member cantilevered from said article-receiving end of the second arm member in a direction projecting into said elongated slot for self-yielding engagement with a coiled article retained in said elongated slot, said slot surfaces of the first and second arm membersd having opposed notches disposed to receive said tang members.

12. The support apparatus of claim 11 having a base connecting said base ends of the first and second arm members.

13. The support apparatus of claim 12 further having a bracket, said bracket having detents and said base having holes disposed to receive said detents.

14. The support apparatus of claim 11 wherein said second arm member is a handle member having an aperture disposed to receive a hand.

* * * * *